US011900896B2

(12) United States Patent
Cheng et al.

(10) Patent No.: US 11,900,896 B2
(45) Date of Patent: Feb. 13, 2024

(54) SOURCE DRIVER AND RELATED CONTROL METHOD

(71) Applicant: NOVATEK Microelectronics Corp., Hsin-Chu (TW)

(72) Inventors: Jhih-Siou Cheng, New Taipei (TW); Yen-Kai Chen, Taichung (TW); Jui-Chan Chang, Hsinchu (TW); Chih-Hsien Chou, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/881,622

(22) Filed: Aug. 5, 2022

(65) Prior Publication Data

US 2023/0138843 A1 May 4, 2023

Related U.S. Application Data

(60) Provisional application No. 63/274,951, filed on Nov. 3, 2021.

(51) Int. Cl.
*G09G 3/32* (2016.01)
*G09G 3/36* (2006.01)

(52) U.S. Cl.
CPC ............. *G09G 3/3688* (2013.01); *G09G 3/32* (2013.01); *G09G 2310/0248* (2013.01); *G09G 2310/0291* (2013.01); *G09G 2310/061* (2013.01); *G09G 2330/023* (2013.01)

(58) Field of Classification Search
None
See application file for complete search history.

(56) References Cited

U.S. PATENT DOCUMENTS 8,963,906 B2 * 2/2015 Oh ........................ G09G 3/3685 345/96
2008/0136806 A1 * 6/2008 Lee .......................... G09G 3/36 345/212
2009/0128533 A1 * 5/2009 Tsubata ................ G09G 3/3648 348/800
2009/0207118 A1 * 8/2009 Lee ...................... G09G 3/3688 345/98
2010/0164929 A1 * 7/2010 Chen .................... G09G 3/3688 345/98
2010/0188389 A1 * 7/2010 Hsu ...................... G09G 3/3611 345/94
2010/0315396 A1 * 12/2010 Weng .................. G09G 3/3688 345/208

(Continued)

FOREIGN PATENT DOCUMENTS

TW 201447861 A 12/2014

*Primary Examiner* — Patrick N Edouard
*Assistant Examiner* — Peijie Shen
(74) *Attorney, Agent, or Firm* — Winston Hsu

(57) ABSTRACT

A source driver includes a plurality of output terminals and a plurality of driving channels. Each of the plurality of driving channels is coupled to an output terminal among the plurality of output terminals and includes an output buffer, an output enable switch and a charge sharing circuit. The output enable switch is coupled between the output buffer and the corresponding output terminal. The charge sharing circuit is coupled to the corresponding output terminal. Wherein, the charge sharing circuits of at least two of the plurality of driving channels are commonly coupled to a charge sharing bus.

17 Claims, 12 Drawing Sheets

(56) References Cited

U.S. PATENT DOCUMENTS

| | | | | |
|---|---|---|---|---|
| 2011/0169813 | A1* | 7/2011 | Jin | G09G 3/20 345/212 |
| 2011/0199397 | A1* | 8/2011 | Ko | G09G 3/3688 345/212 |
| 2012/0105494 | A1* | 5/2012 | Lee | G09G 3/3614 345/215 |
| 2012/0218316 | A1* | 8/2012 | Wang | G09G 3/3688 345/89 |
| 2013/0083093 | A1* | 4/2013 | Kim | G09G 3/3258 345/212 |
| 2013/0169617 | A1* | 7/2013 | Cheng | G09G 3/3614 345/212 |
| 2014/0111494 | A1* | 4/2014 | Su | G09G 3/3614 345/94 |
| 2014/0210698 | A1* | 7/2014 | Huang | G09G 3/3614 345/98 |
| 2014/0375536 | A1* | 12/2014 | Kim | G09G 3/3614 345/94 |
| 2015/0123961 | A1* | 5/2015 | Park | G09G 3/3614 345/212 |
| 2016/0063915 | A1* | 3/2016 | Kim | G09G 3/3685 345/96 |
| 2016/0180776 | A1* | 6/2016 | Cho | G09G 3/20 345/215 |
| 2017/0186389 | A1* | 6/2017 | Hwang | G09G 3/2092 |
| 2019/0156716 | A1* | 5/2019 | Kim | G09G 3/006 |
| 2020/0090563 | A1* | 3/2020 | Yen | G01R 31/3004 |
| 2021/0407349 | A1* | 12/2021 | Choi | G09G 3/3614 |
| 2022/0366842 | A1* | 11/2022 | Kwon | G09G 3/3275 |

* cited by examiner

SOURCE DRIVER AND RELATED CONTROL METHOD

CROSS REFERENCE TO RELATED APPLICATIONS

This application claims the benefit of U.S. Provisional Application No. 63/274,951, filed on Nov. 3, 2021. The content of the application is incorporated herein by reference.

BACKGROUND OF THE INVENTION

1. Field of the Invention

The present invention relates to a source driver for driving a display panel, and more particularly, to a source driver capable of charge sharing for a display panel.

2. Description of the Prior Art

Nowadays, battery life has become an important issue of a display system in the application of small mobile devices. In the display system, the power consumption is mainly generated from a source driver driving the display panel, where a great amount of power is required for driving the panel loading during the display operations. The designers of the source driver have made their best efforts to achieve power reduction without influencing the display performance.

SUMMARY OF THE INVENTION

It is therefore an objective of the present invention to provide a source driver for a display panel. The source driver includes a plurality of driving channel circuits (or called driving channels as a short name), where each driving channel includes a charge sharing circuit. The charge sharing circuit may be used to couple a driving channel output terminal (or called output terminal as a short name) of each driving channel together, to perform charge sharing. With charge sharing between the driving channels, the electric charges in the driving channels may be equally allocated to each driving channel, providing pre-charge for the incoming data voltage. As a result, the overall power consumption for the driving channels to drive the display panel may be reduced.

An embodiment of the present invention discloses a source driver, which comprises a plurality of output terminals and a plurality of driving channels. Each of the plurality of driving channels is coupled to an output terminal among the plurality of output terminals and comprises an output buffer, an output enable switch and a charge sharing circuit. The output enable switch is coupled between the output buffer and the corresponding output terminal. The charge sharing circuit is coupled to the corresponding output terminal. Wherein, the charge sharing circuits of at least two of the plurality of driving channels are commonly coupled to a charge sharing bus.

Another embodiment of the present invention discloses a method of controlling a source driver. The source driver has a plurality of driving channels. The method comprises steps of: controlling each of the plurality of driving channels to be coupled to an output terminal among a plurality of output terminals, to output data voltages to the corresponding output terminal in a driving phase of a display line period;

and determining whether to couple each of the plurality of driving channels to a charge sharing bus in a charging phase of the display line period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
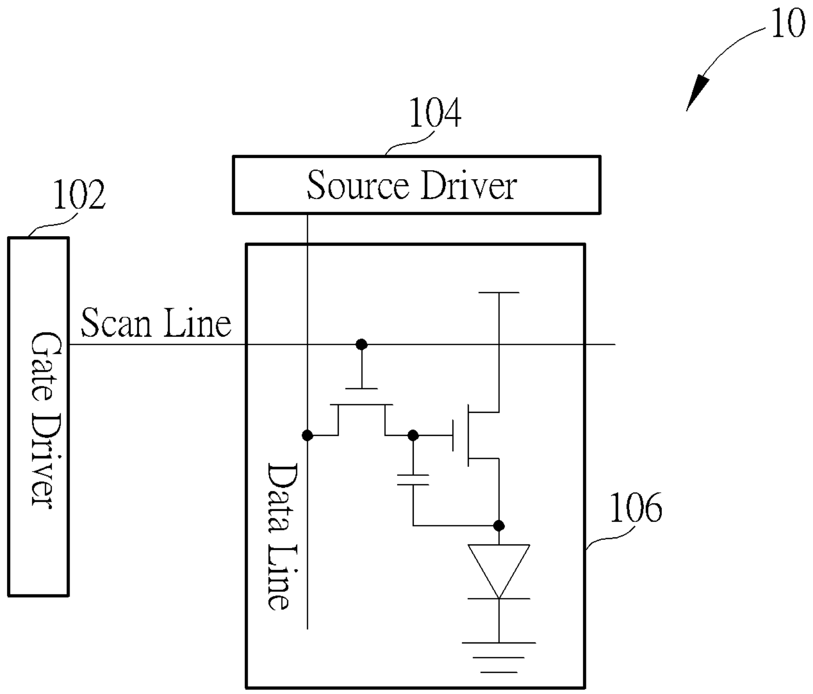
FIG. 1 is a schematic diagram of a simplified structure of a display system according to an embodiment of the present invention.

FIG. 1 is a schematic diagram of a simplified structure of a display system 10 according to an embodiment of the present invention. As shown in FIG. 1, the display system 10 includes a gate driver 102, a source driver 104 and a display panel 106. Note that FIG. 1 only shows a pixel structure on the display panel 106, but those skilled in the art should know that there may be a pixel array having a plurality of pixels on the display panel 106. The gate driver 102 may be coupled to the display panel 106 through a plurality of scan lines, where each scan line is coupled to a row of pixels. The source driver 104 may be coupled to the display panel 106 through a plurality of data lines, where each data line is coupled to a column of pixels. Also note that the pixel structure shown in FIG. 1 is a light-emitting diode (LED) pixel having an LED for light emission, which means that the display panel 106 may be an LED panel such as an organic-LED (OLED) panel, mini-LED panel or micro-LED panel. In another embodiment, the display panel 106 may be a liquid crystal display (LCD) panel, plasma display panel (PDP), or any other type of display device.

As shown in FIG. 1, the gate driver 102 is configured to provide gate control signals to scan the pixels on the display panel 106 through the scan lines, and the source driver 104 is configured to send data voltages to the pixels on the display panel 106 through the data lines. Since a data line is coupled to a great number of pixels in a column, there may be a tremendous capacitive load on the data line. Therefore, the source driver 104 is requested to consume a great amount of power to drive the capacitive loads of the data lines when outputting the data voltages.

Figure 2:
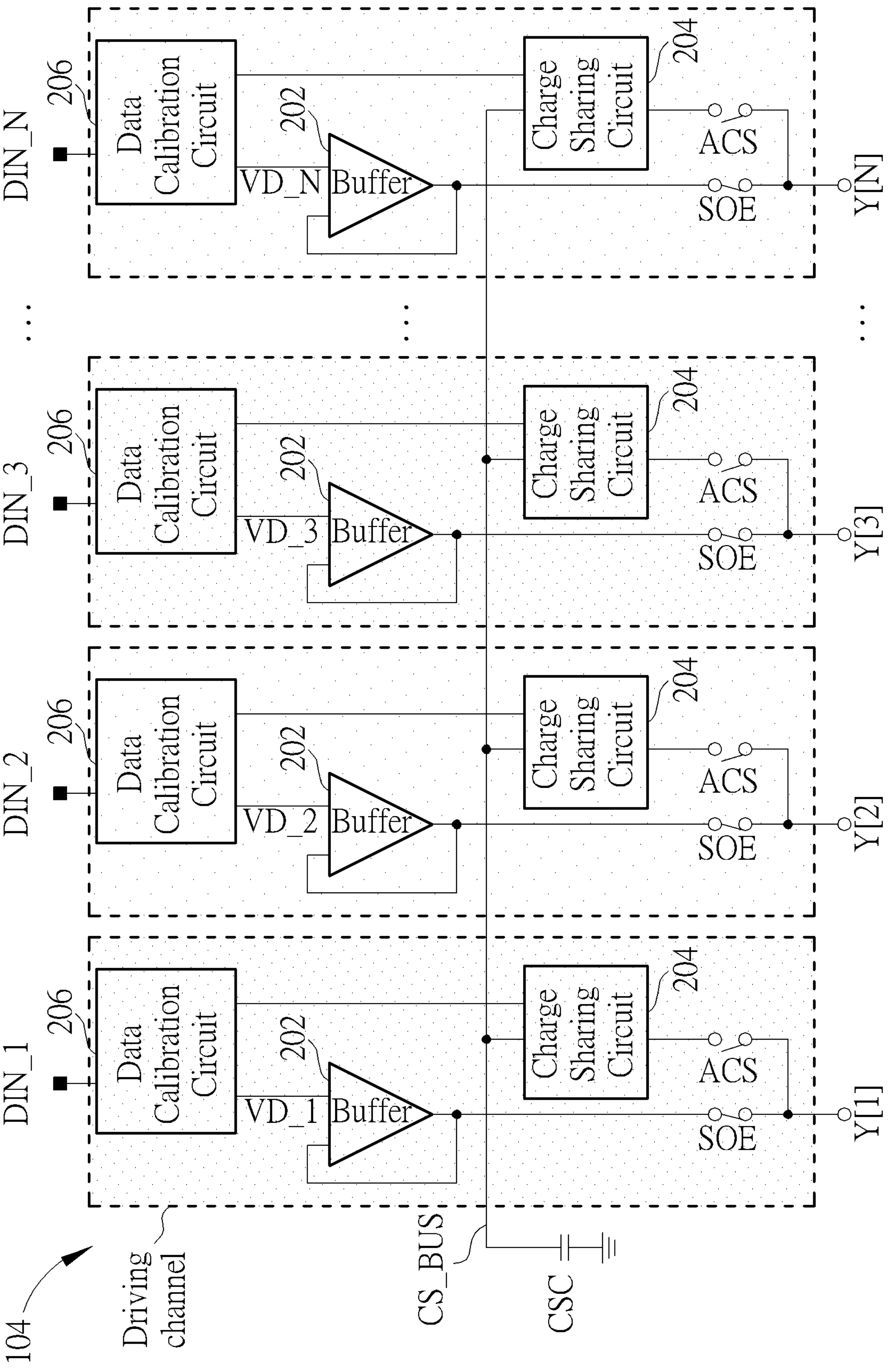
FIG. 2 is a schematic diagram of a detailed implementation of the source driver according to an embodiment of the present invention.

FIG. 2 is a schematic diagram of a detailed implementation of the source driver 104 according to an embodiment of the present invention. The source driver 104 includes multiple driving channel circuits (abbreviated as driving channels hereinafter). Each driving channel includes an output buffer 202, a charge sharing circuit 204 and a data calibration circuit 206, where the data calibration circuit 206 may be integrated with a digital-to-analog converter (DAC) of the driving channel. The driving channels may also include output terminals Y[1]-Y [N] or may be coupled to output terminals Y[1]-Y [N], respectively, where N is a positive integer. Each of the output terminals Y[1]-Y [N] is configured to be coupled to one or more data lines on the display panel 106. In a display line period, the driving channels may receive display data DIN_1-DIN_N, respectively, and convert the display data DIN_1-DIN_N into data voltages VD_1-VD_N through the DAC, where the data voltages VD_1-VD_N are forwarded by the corresponding output buffer 202 in the driving channel and output to the data lines through the corresponding output terminals Y[1]-Y[N]. The output buffer 202 is configured to provide sufficient driving capability to drive the capacitive load(s) on the data line(s).

The charge sharing circuit 204 may be coupled between the corresponding output terminal Y[1]-Y[N] and a charge sharing bus CS_BUS, to provide a charging path and/or a discharging path between the output terminal Y[1]-Y[N] and the charge sharing bus CS_BUS. The charge sharing circuit 204 allows several or all of the driving channels to be commonly coupled to the charge sharing bus CS_BUS, to perform charge sharing between different driving channels. In order to effectively control the charge sharing operations, each driving channel may further include an output enable switch SOE and a charge sharing switch ACS. The output enable switch SOE may be coupled between the output buffer 202 and the corresponding output terminal Y[1]-Y [N], and the charge sharing switch ACS may be coupled between the charge sharing circuit 204 and the corresponding output terminal Y[1]-Y[N]. In another embodiment, the charge sharing switch ACS may be coupled between the charge sharing circuit 204 and the charge sharing bus CS_BUS; alternatively, the charge sharing switch ACS may be integrated in the charge sharing circuit 204.

The charge sharing bus CS_BUS may further be coupled to a charge sharing capacitor CSC. The charge sharing capacitor CSC may be used to store the electric charges received from the output terminals Y[1]-Y[N], and pre-charge (or pre-discharge) the output terminals Y[1]-Y[N] and the corresponding data lines so that the voltage of any of the output terminals Y[1]-Y[N] at the end of the pre-charge operation can be closer to the next data voltage (corresponding to the next display data) before this next data voltage is output to the data line, thereby reducing the power consumption required for outputting the next data voltage.

In an embodiment, a display line period of display operations may be divided into a driving phase and a charging phase. The driving phase may include a display interval where the data voltages are output to the display panel 106 and the output buffer 202 is driving the data lines. The charging phase may be implemented in a blanking interval where no data voltage is output to the display panel 106. In the driving phase, the output enable switch SOE is turned on and the charge sharing switch ACS is turned off, and thus the output buffer 202 sends a data voltage to the data line. In the charging phase, the output enable switch SOE is turned off and the charge sharing switch ACS may be turned on, and thus the charging or discharging path between the corresponding output terminal and the charge sharing bus CS_BUS may be conducted. In such a situation, several or all of the output terminals Y[1]-Y[N] are commonly coupled to the charge sharing bus CS_BUS and the charge sharing capacitor CSC through the corresponding charge sharing circuit 204, to be pre-charged (or pre-discharged) to a voltage level closer to the next data voltage.

Because a driving channel reuses the electric charges received from the charge sharing bus CS_BUS to pre-charge or pre-discharge the data line(s) in the charging phase, where the electric charges may come from other driving channels or the charge sharing capacitor CSC, the required power consumption in the next driving phase may be saved. Preferably, the charge sharing capacitor CSC should be large enough to store the electric charges of all driving channels, so basically this capacitor is placed outside the chip. In an embodiment, the driving channels of the source driver 104 may be implemented in integrated circuits (ICs) included in one or more chips, and the charge sharing bus CS_BUS may include inter-chip and/or intra-chip conducting wires coupled between the driving channels; hence, the charge sharing capacitor CSC may be an off-chip capacitor capable of storing sufficient electric charges for charge sharing.

In the embodiments of the present invention, the charge sharing circuit 204 may include an N-type implementation, a P-type implementation, and/or a hybrid implementation. In the N-type implementation, an NMOS transistor is applied to forward the electric charges between the driving channel and the charge sharing bus CS_BUS. In the P-type implementation, a PMOS transistor is applied to forward the electric charges between the driving channel and the charge sharing bus CS_BUS. The hybrid implementation, as a combination of the N-type and P-type implementations, includes an NMOS transistor and a PMOS transistor. In the hybrid implementation, the slew rates of both rising and falling on the output terminal are guaranteed to be identical, and the charge sharing may be realized more effectively.

Figure 3A:
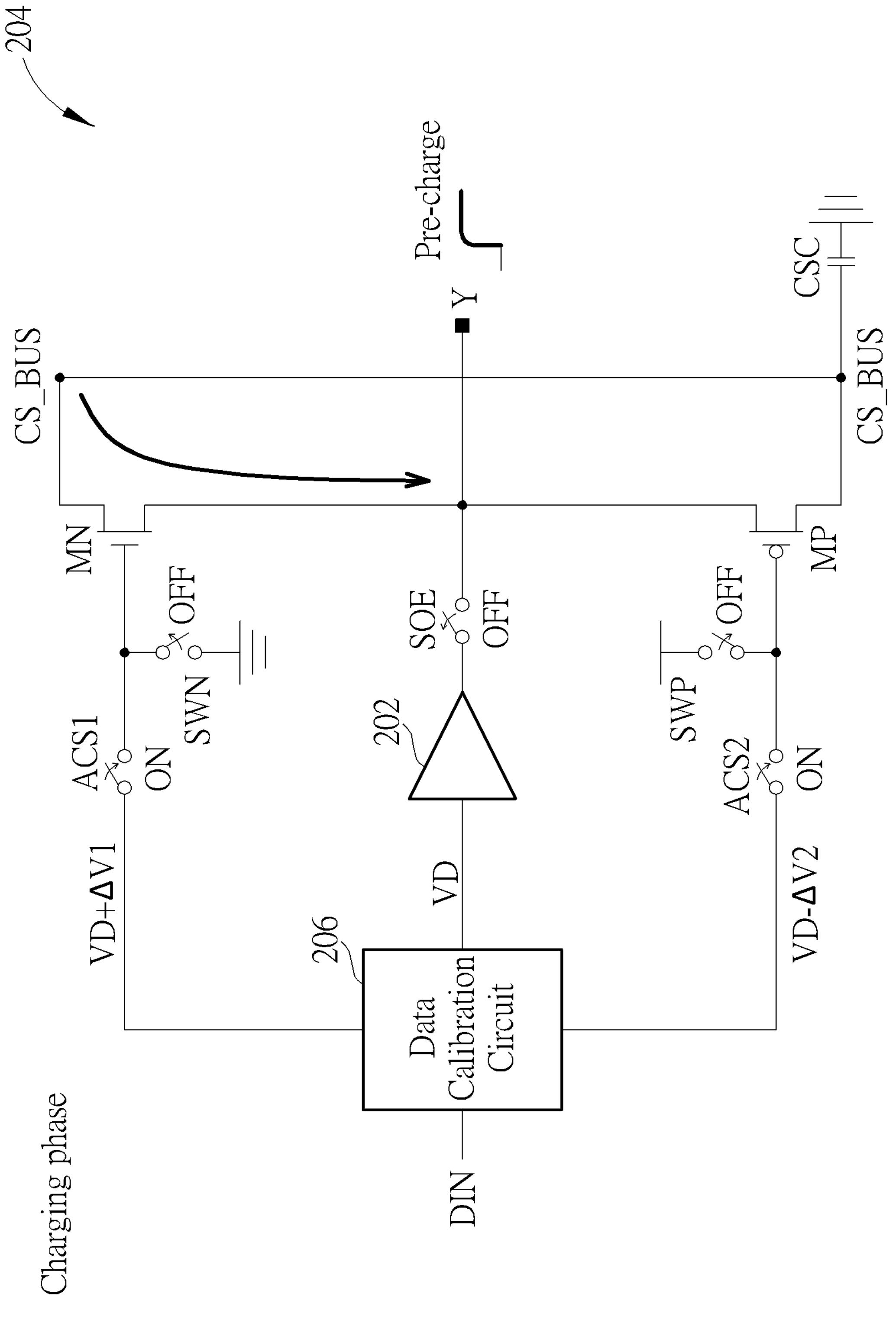
FIG. 3A and FIG. 3B are schematic diagrams of a detailed implementation of the charge sharing circuit according to an embodiment of the present invention.
Figure 3B:
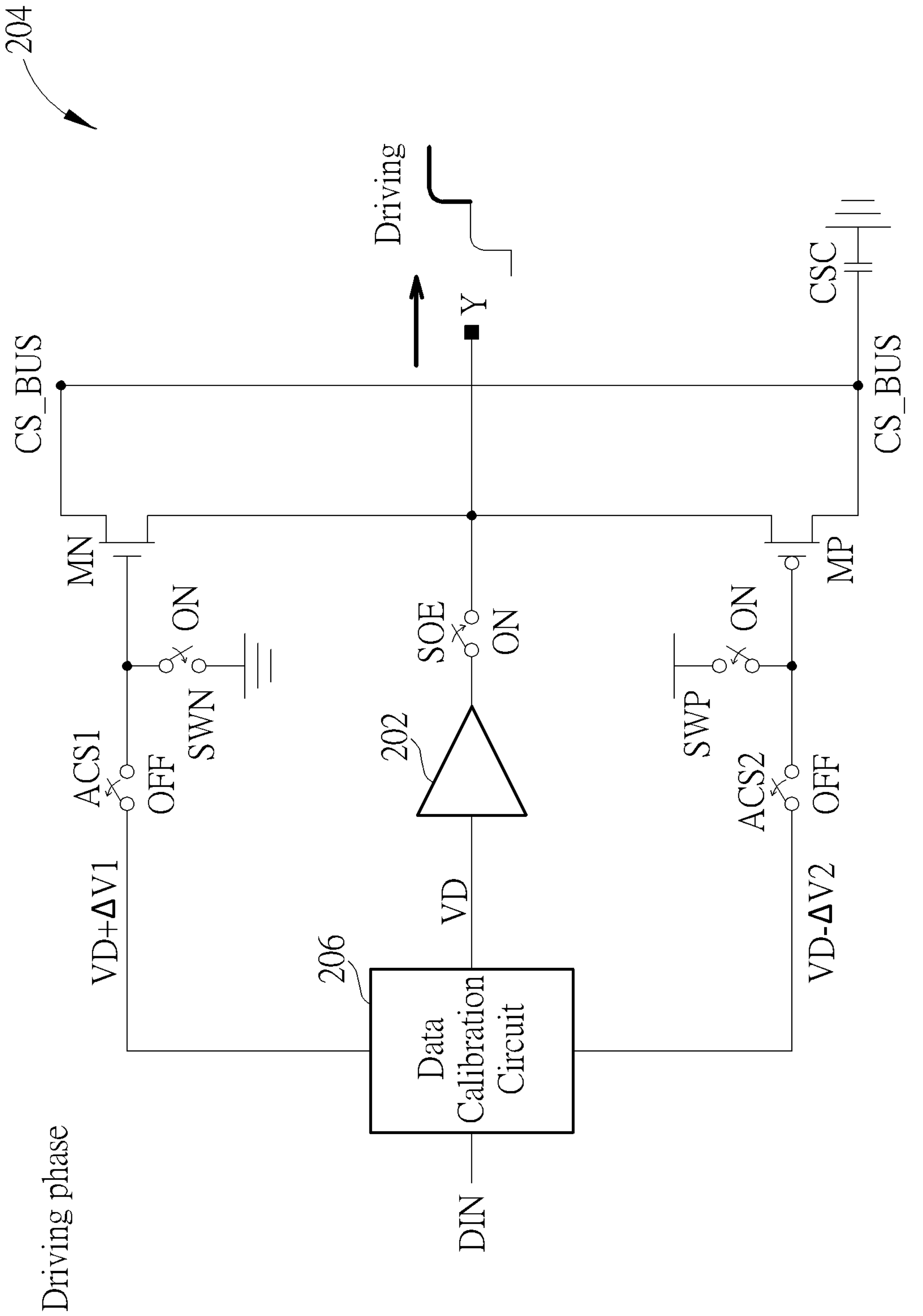

FIGS. 3A and 3B are schematic diagrams of a detailed implementation of the charge sharing circuit 204 according to an embodiment of the present invention. As shown in FIGS. 3A and 3B, the charge sharing circuit 204 may include an NMOS transistor MN, a PMOS transistor MP, charge sharing switches ACS1 and ACS2, and control switches SWN and SWP. FIGS. 3A and 3B illustrate the hybrid implementation with the NMOS transistor MN and the PMOS transistor MP, so as to achieve more effective charge sharing. The charge sharing switches ACS1 and ACS2 may be used to implement the charge sharing switch ACS as shown in FIG. 2. Further, in order to facilitate the illustrations, the output buffer 202 and the DAC integrated with the data calibration circuit 206 are also shown in FIGS. 3A and 3B.

In detail, both the NMOS transistor MN and the PMOS transistor MP are coupled between the output terminal Y of the driving channel and the charge sharing bus CS_BUS, which may further be coupled to the charge sharing capacitor CSC. More specifically, as for the NMOS transistor MN, the drain terminal is coupled to the charge sharing bus CS_BUS, the source terminal is coupled to the output terminal Y, and the gate terminal is coupled to the data calibration circuit 206 through the charge sharing switch ACS1. As for the PMOS transistor MP, the drain terminal is coupled to the charge sharing bus CS_BUS, the source terminal is coupled to the output terminal Y, and the gate terminal is coupled to the data calibration circuit 206 through the charge sharing switch ACS2.

The operations of the charge sharing circuit 204 may be controlled by the data calibration circuit 206; that is, the data calibration circuit 206 may provide control voltages for the charge sharing circuit 204, to determine whether to enable the charge sharing operations. In general, charge sharing is required if there is an obvious voltage difference between the current data voltage on the output terminal Y and the next data voltage to be output to the output terminal Y. In addition, the NMOS transistor MN or the PMOS transistor MP is turned on only when its gate-to-source voltage exceeds the threshold voltage. Therefore, the data calibration circuit 206 may control the charge sharing circuit 204 based on the voltage difference between the current data voltage and the next data voltage, and also based on the threshold voltage of the NMOS transistor MN and/or the PMOS transistor MP.

As shown in FIGS. 3A and 3B, the data calibration circuit 206 is integrated with the DAC, which is configured to convert the input display data DIN into a data voltage VD and output the data voltage VD to the output buffer 202. When the data voltage VD is output to the output buffer 202, the data calibration circuit 206 may generate a voltage greater than the data voltage VD with a certain positive voltage shift +ΔV1 and output this voltage to the NMOS transistor MN, where the voltage shift +ΔV1 may be determined in consideration of the threshold voltage of the NMOS transistor MN. In the same way, the data calibration circuit 206 may generate a voltage smaller than the data voltage VD with a certain negative voltage shift −ΔV2 and output this voltage to the PMOS transistor MP, where the voltage shift −ΔV2 may be determined in consideration of the threshold voltage of the PMOS transistor MP. Based on the characteristics of the NMOS transistor MN and the PMOS transistor MP, the values of the voltage shifts ΔV1 and ΔV2 may be the same or different.

Figure 4:
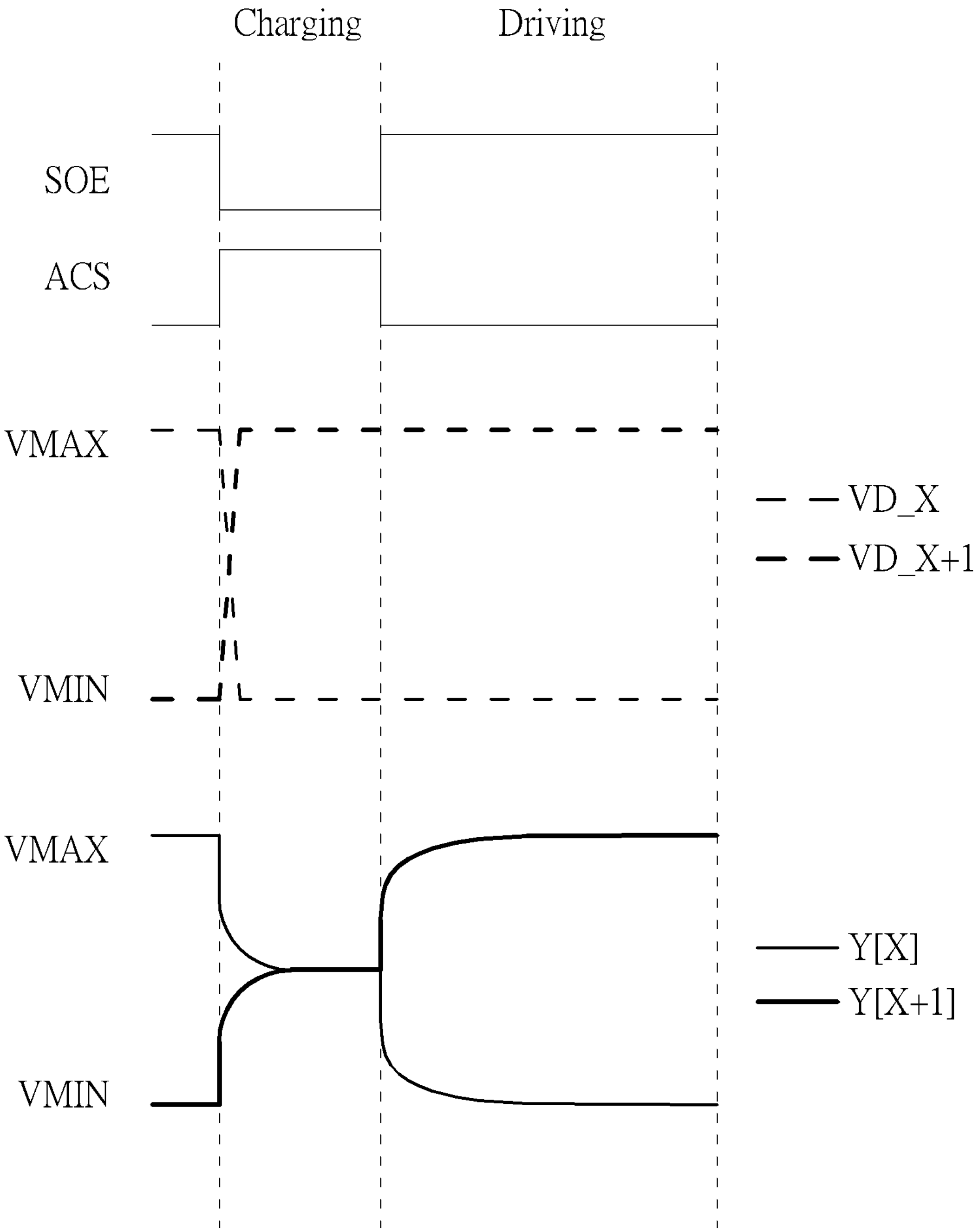
FIG. 4 is a waveform diagram of the data voltages of the driving channels according to an embodiment of the present invention.

FIG. 4 is a waveform diagram of the data voltages of the driving channels according to an embodiment of the present invention. FIG. 4 shows the control signals for the output enable switch SOE and the charge sharing switch ACS (including the charge sharing switches ACS1 and ACS2 shown in FIGS. 3A and 3B), and also shows the waveforms of the data voltages VD_X and VD_X+1 at the DAC output and the voltages on the output terminals Y[X] and Y[X+1]. In this embodiment, there are two driving channels commonly coupled to the charge sharing bus CS_BUS, and the output terminals Y[X] and Y[X+1] are included in or coupled to these two driving channels, respectively. For example, in a first driving channel, the output buffer 202 may receive the data voltage VD_X and forward the data voltage VD_X to the output terminal Y[X]; and in a second driving channel, the output buffer 202 may receive the data voltage VD_X+1 and forward the data voltage VD_X+1 to the output terminal Y[X+1]. The output terminals Y[X] and Y[X+1] are used to drive the data lines on the display panel, and thus the voltages on the output terminals Y[X] and Y[X+1] may change slowly due to the capacitive loads of the data lines.

Refer to FIG. 4 along with FIGS. 3A and 3B, where FIG. 3A illustrates the charging phase and FIG. 3B illustrates the driving phase. In the charging phase, the output enable switch SOE is turned off and no data voltage is output to the output terminal Y. As the charge sharing switches ACS1 and ACS2 are turned on, one of the NMOS transistor MN and the PMOS transistor MP may be turned on, allowing the output terminal Y of the driving channel to be shorted to the charge sharing bus CS_BUS through the charge sharing circuit 204. Therefore, the electric charges from the charge sharing bus CS_BUS and the charge sharing capacitor CSC may flow to the output terminal Y through the NMOS transistor MN of the charge sharing circuit 204, so as to pre-charge the voltage of the output terminal Y to a middle level, as shown in FIG. 3A. In another driving channel, the electric charges may flow to the charge sharing bus CS_BUS and the charge sharing capacitor CSC from the output terminal Y through the PMOS transistor MP of the charge sharing circuit 204, so as to pre-discharge the voltage of the output terminal Y to a middle level.

As a result, the operation of charge sharing redistributes the electric charges in these driving channels left from the previous data voltages.

As shown in FIG. 4, in the display line period, the data voltage VD_X has a full-swing toggle from the maximum level VMAX to the minimum level VMIN, and the data voltage VD_X+1 has a full-swing toggle from the minimum level VMIN to the maximum level VMAX. The maximum level VMAX and the minimum level VMIN may be the maximum and minimum data voltages corresponding to the maximum and minimum data codes, respectively, and are between a supply voltage VDDA and a ground voltage GND. In the charging phase, charge sharing may be performed between these two driving channels, allowing the output terminals Y[X] and Y[X+1] to reach the middle level. In such a situation, the output terminals Y[X] and Y[X+1] commonly coupled to the charge sharing bus CS_BUS may be pre-charged or pre-discharged to approximately the middle level without consuming extra power in the charging phase, and the power consumption for charging the data lines in the driving phase may be reduced.

In an exemplary embodiment, a special image pattern is displayed so that the data voltage with a full-swing toggle from the maximum level VMAX to the minimum level VMIN is applied to odd driving channels of the source driver 104 and the data voltage with a full-swing toggle from the minimum level VMIN to the maximum level VMAX is applied to even driving channels of the source driver 104. In such a situation, if all the driving channels are commonly coupled to the charge sharing bus CS_BUS to perform charge sharing, a significant power reduction may be achieved.

Subsequently, in the driving phase, the charge sharing switches ACS1 and ACS2 are turned off and the output enable switch SOE is turned on, and the output buffer 202 of the driving channel is coupled to the output terminal Y through the turned-on output enable switch SOE. Therefore, the data voltages VD_X and VD_X+1 are output to the corresponding output terminals Y[X] and Y[X+1], respectively. As shown in FIG. 3B, the control switches SWN and SWP are also turned on to ensure that the NMOS transistor MN and the PMOS transistor MP are completely off and may not interfere with data output in the driving phase. As a result, the output buffer 202 only needs to provide electric charges for one half of the voltage swing. In an embodiment, supposing that half of the driving channels in the source driver 104 have a positive voltage swing and the other half of the driving channels in the source driver 104 have a negative voltage swing, the charge sharing operation allows the source driver 104 to save nearly half power consumption in data driving.

Accordingly, the enablement of the charge sharing circuit 204 may be determined according to the data voltage of the corresponding driving channel. This is because the charge sharing may be more effective if the data voltage has a larger transition. In an embodiment, the charge sharing circuit 204 may compare the current data voltage on the output terminal Y of the driving channel with the next data voltage to be output to the output terminal Y, to determine whether to enable the charge sharing circuit 204 to couple the corresponding driving channel to the charge sharing bus CS_BUS in the charging phase. More specifically, the charge sharing circuit 204 may be enabled to couple the output terminal Y of the driving channel to the charge sharing bus CS_BUS when the voltage difference between the current data voltage on the output terminal Y and the next data voltage to be output to the output terminal Y is greater than a threshold. On the contrary, when the voltage difference between the current data voltage on the output terminal Y and the next data voltage to be output to the output terminal Y is equivalent to or smaller than the threshold, the charge sharing circuit 204 may be disabled; hence, the output terminal Y of the driving channel may not be coupled to the charge sharing bus CS_BUS and the charge sharing of this driving channel may not be performed.

Referring back to FIGS. 3A and 3B, the transistors MP and MN may realize the comparison of the current data voltage and the next data voltage. More specifically, the source terminal of the transistor MP or MN is coupled to the output terminal Y and receives the current data voltage from the output terminal Y. The gate terminal of the transistor MP or MN receives the next data voltage (with a voltage shift +ΔV1 or −ΔV2) from the data calibration circuit 206 when the charge sharing switches ACS1 and ACS2 are turned on. Therefore, the comparison result, as indicated by the gate-to-source voltage of the transistor MP or MN, may determine whether to turn on the transistor MP or MN.

Note that the transistors MP and MN have a threshold voltage such that the gate-to-source voltage should be large enough to overcome the threshold voltage to turn on the corresponding transistor MP or MN. This causes a dead zone of voltage range where the difference of data voltages does not exceed the threshold voltage. In the dead zone, none of the NMOS transistor MN and the PMOS transistor MP is turned on, and this driving channel will not perform charge sharing.

Figure 5:
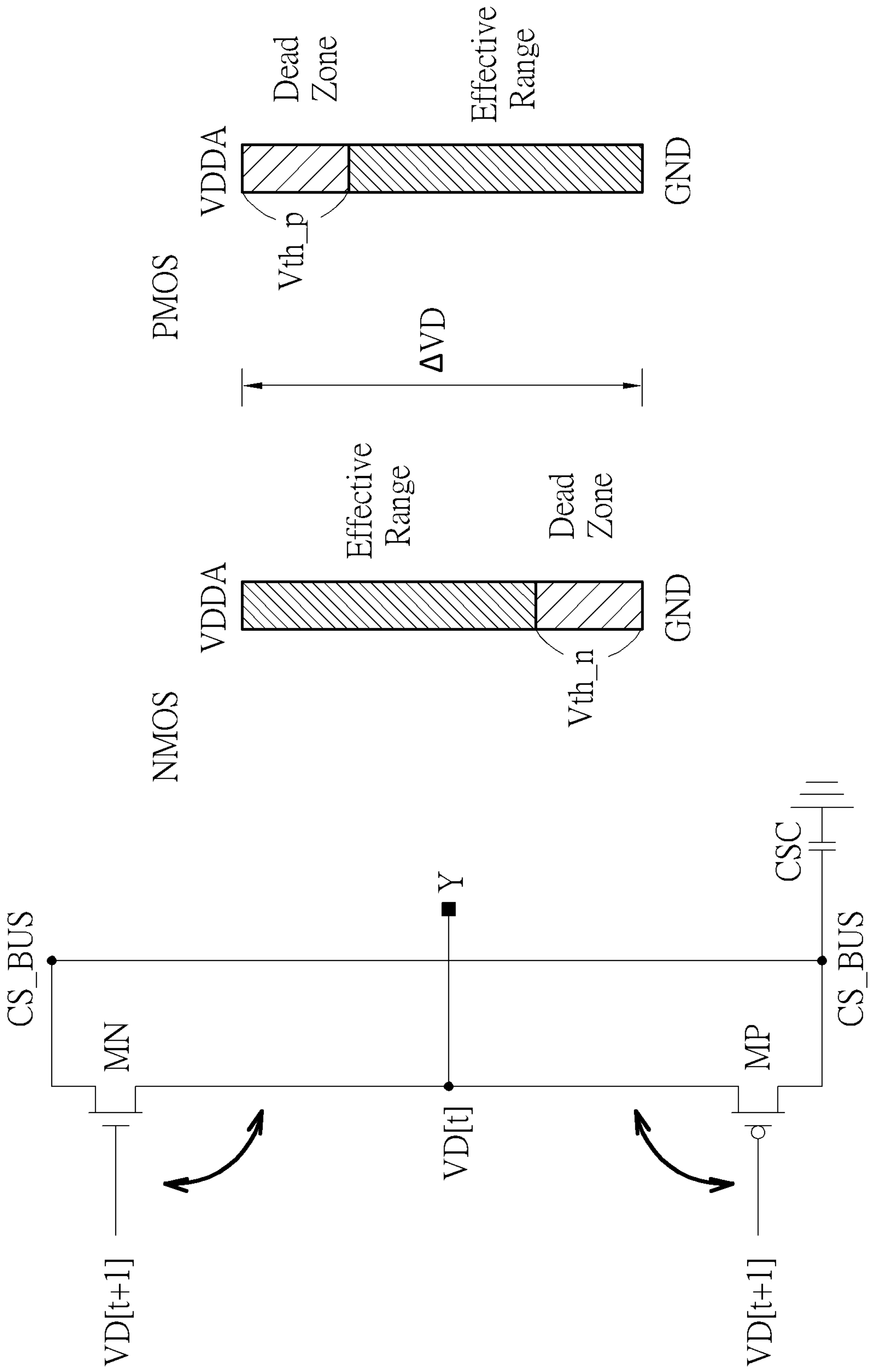
FIG. 5 illustrates the dead zone of the charge sharing circuit caused by the threshold voltage of the transistors.

FIG. 5 illustrates the dead zone of the charge sharing circuit 204 caused by the threshold voltage of the transistors MN and MP. As shown in FIG. 5, the current data voltage on the output terminal Y is VD[t] and the next data voltage to be output to the output terminal Y in the incoming display line period is VD[t+1]. Supposing that there is no voltage shift generated by the data calibration circuit 206, the current data voltage VD[t] on the output terminal Y is received by each of the transistors MN and MP through the source terminal, and the next data voltage VD[t+1] which is ready at the output terminal of the DAC is received by each of the transistors MN and MP through the gate terminal.

Without the implementation of data calibration or voltage shift, the NMOS transistor MN is turned on only when the next data voltage VD[t+1] is greater than the current data voltage VD[t] plus the threshold voltage Vth_n of the NMOS transistor MN; that is, VD[t+1]+>VD[t]+Vth_n. In other words, the voltage difference ΔVD between the next data voltage VD[t+1] and the current data voltage VD[t] should be larger than the threshold voltage Vth_n so that the NMOS transistor MN can be turned on and the charge sharing is effective. This causes the voltage difference ΔVD to fall in a dead zone which means the voltage difference ΔVD is lower than the threshold voltage Vth_n. In a similar way, with the threshold voltage Vth_p of the PMOS transistor MP, there is a dead zone which means the voltage difference ΔVD is lower than the threshold voltage Vth_p.

The voltage shift +ΔV1 or −ΔV2 provided by the data calibration circuit 206 may be used to solve the dead zone problem and extend the operation range of the charge sharing circuit 204. In an embodiment, the values of the voltage shifts +ΔV1 and −ΔV2 may be designed to entirely cover the dead zone where the charge sharing is not performed. To achieve this purpose, the voltage shift +ΔV1 may be set to be equal to the threshold voltage of the NMOS transistor MN, and the voltage shift −ΔV2 may be set to be equal to the threshold voltage of the PMOS transistor MP. In such a situation, all driving channels in the source driver 104 may perform charge sharing in the charging phase.

However, the threshold voltage of the transistors MN and MP may possess a deviation due to the body effect and/or PVT (process, voltage, temperature) variations, such that it is hard to control the voltage shift to be exactly equal to the threshold voltage. In addition, the charge sharing operation in the charging phase aims at increasing or decreasing the voltage level of the output terminal Y to make this voltage level approach the next data voltage, so that power consumption required for charging the data lines at the arrival of the next data voltage may be reduced. Thus, pre-charging the output terminal Y and the data line to a higher level before reception of the next data voltage will make sense only if the next data voltage is greater than the current data voltage with a certain difference; and pre-discharging the output terminal Y and the data line to a lower level before reception of the next data voltage will make sense only if the next data voltage is smaller than the current data voltage with a certain difference. Therefore, if the voltage shift is set to be exactly equal to the typical threshold voltage of the transistor MP or MN in the charge sharing circuit 204, sometimes the charge sharing operation might generate redundant power consumption if the voltage of the output terminal Y is pre-charged (or pre-discharged) to a level farther from the next data voltage in the charging phase.

Therefore, it is preferable to set the voltage shift to be slightly smaller than the threshold voltage of the transistor MP or MN, to deliberately preserve a small dead zone and ensure that the charge sharing operation may not be wrongly performed. In such a situation, if the current data voltage is already close to the next data voltage in a driving channel, charge sharing may not be effective for this driving channel; that is, the charge sharing circuit 204 is not enabled when the transition of data voltage is small. For example, if the threshold voltage is 1V, the voltage shift may be set to 0.7V, so that the charge sharing operation is not performed when the difference between the next data voltage and the current data voltage is extremely small (i.e., preserving a 0.3V dead zone). Since power consumption may not be saved by charge sharing if the current data voltage and the next data voltage are equal or close to each other, disabling the charge sharing operation when these two voltages are approximately equal will not reduce the performance of charge sharing.

Since the enablement of the charge sharing circuit 204 is determined based on the data voltages of the corresponding driving channel, each driving channel may be determined to perform charge sharing or not independently. In other words, the charge sharing circuit 204 is turned on or off based on the comparison result of the current data voltage on the output terminal of the corresponding driving channel and the next data voltage to be output to the output terminal of the corresponding driving channel, and different charge sharing circuits may operate differently since the data voltages on different driving channels may usually be different.

Figure 6:
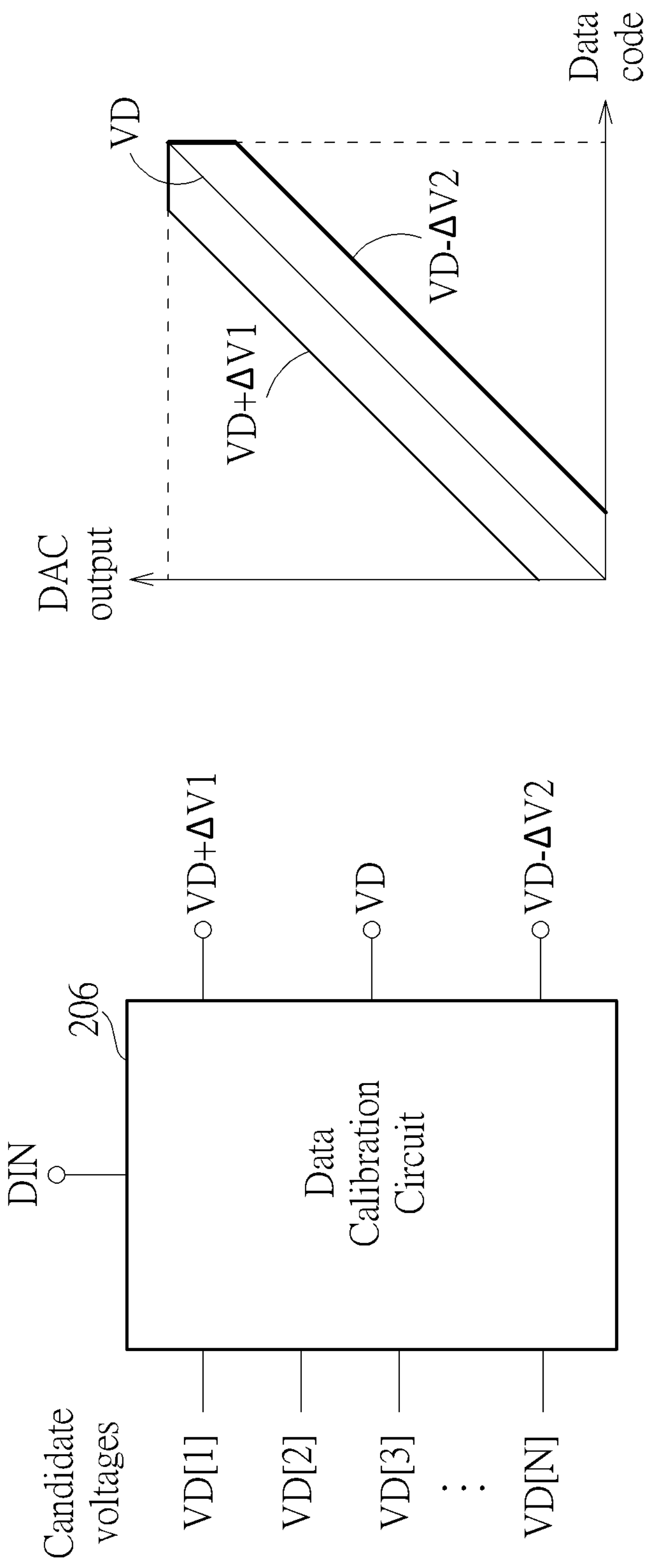
FIG. 6 illustrates an exemplary implementation of the data calibration circuit integrated with the DAC of the driving channel.

The values of the voltage shifts +ΔV1 and −ΔV2 may be determined in the data calibration circuit 206. FIG. 6 illustrates an exemplary implementation of the data calibration circuit 206 integrated with the DAC of the driving channel, which may be applicable to the embodiment as shown in FIGS. 3A and 3B. In the source driver, the DAC is commonly used to convert a digital display data (or called input data code) DIN into an analog data voltage. A general DAC may be a selection circuit for outputting one data voltage, and the output data voltage may be selected from multiple candidate voltages according to the input display data DIN.

In the embodiment as shown in FIG. 6, the data calibration circuit 206 is integrated with the DAC, to be a selection circuit for outputting three different voltages, which include the data voltage VD for the output terminal Y of the driving channel, a first voltage equal to the data voltage VD plus the voltage shift ΔV1 for the NMOS transistor MN of the charge sharing circuit 204, and a second voltage equal to the data voltage VD minus the voltage shift ΔV2 for the PMOS transistor MP of the charge sharing circuit 204. The data voltage VD may be selected from the candidate voltages (i.e., VD[1]-VD[N]) according to the data code of the input display data DIN, as similar to the general DAC described above. In addition, the data voltage VD with a voltage shift ΔV1 or ΔV2 may be easily implemented in the DAC by placing extra switches to select a certain candidate voltage according to the input data code plus or minus a shift code. The advantage of this data calibration scheme is that the value of the voltage shift ΔV1 or ΔV2 is determined based on a fixed shift code. Therefore, the voltage shift ΔV1 or ΔV2 may easily be set to cover the dead zone of the charge sharing circuit 204 with an appropriate shift code value.

Figure 7:
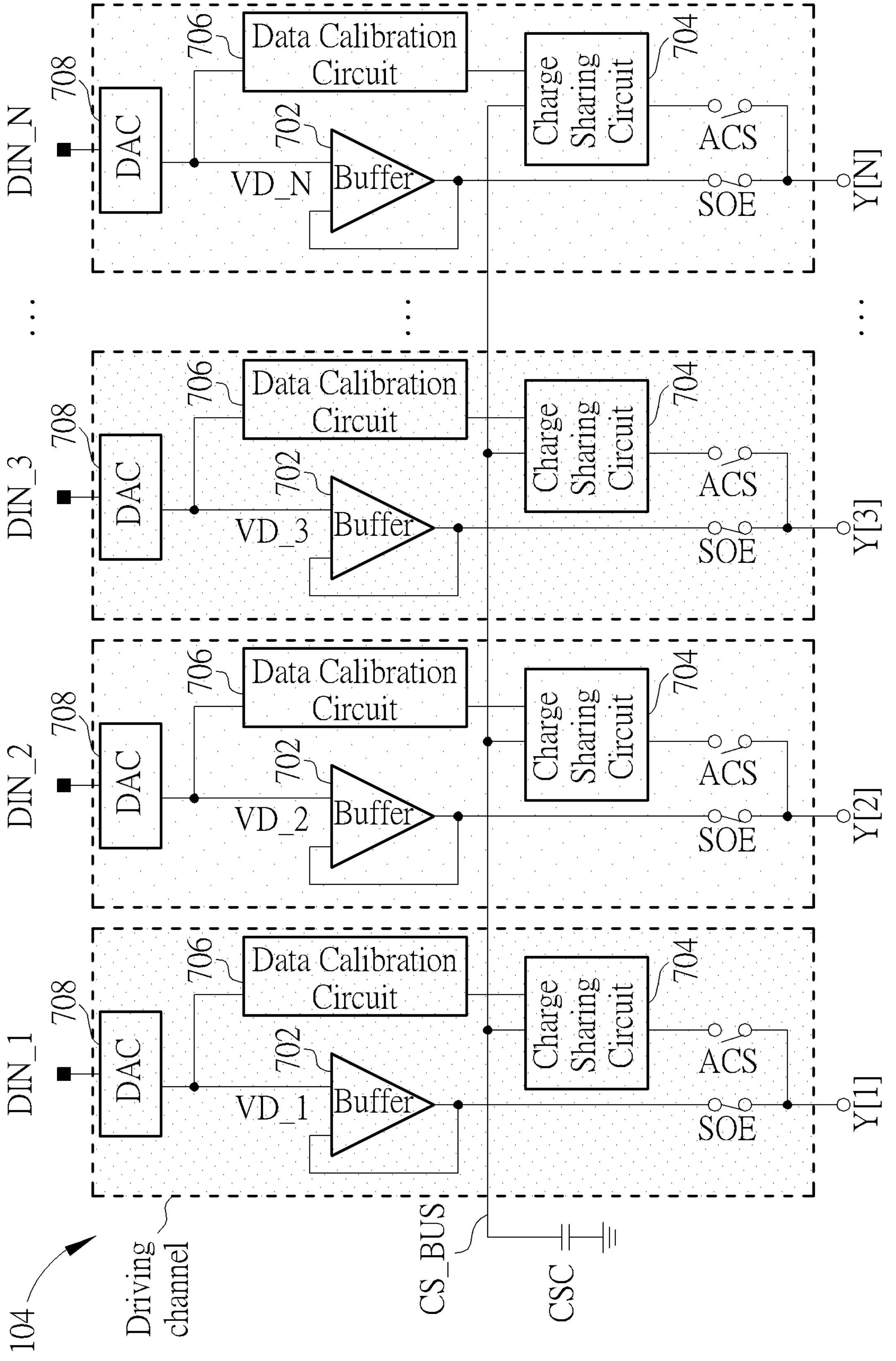
FIG. 7 is a schematic diagram of another implementation of the source driver according to an embodiment of the present invention.

FIG. 7 is a schematic diagram of another implementation of the source driver 104 according to an embodiment of the present invention. As shown in FIG. 7, the source driver 104 includes multiple driving channels, each of which includes an output buffer 702, a charge sharing circuit 704, a data calibration circuit 706, a DAC 708, an output enable switch SOE and a charge sharing switch ACS. The driving channels may also include output terminals Y[1]-Y[N] or may be coupled to output terminals Y[1]-Y[N], respectively, where N is a positive integer. In a display line period, the driving channels may receive display data DIN_1-DIN_N, respectively, where the DAC 708 converts the display data DIN_1-DIN_N into data voltages VD_1-VD_N, which are forwarded by the corresponding output buffer 202 in the driving channel and output to the data lines through the corresponding output terminals Y[1]-Y[N]. Similarly, the output enable switch SOE is turned on in the driving phase to enable data output, and the charge sharing switch ACS is turned on in the charging phase to perform charge sharing through the charge sharing bus CS_BUS and the charge sharing capacitor CSC.

The implementations and operations of the output buffer 702 and the charge sharing circuit 704 are similar to those of the output buffer 202 and the charge sharing circuit 204 shown in FIG. 2, and will not be repeated herein. The source driver 104 of FIG. 7 differs from the source driver 104 of FIG. 2 in the implementations and operations of the data calibration circuit 706 and the DAC 708. In this embodiment, the data calibration circuit 706 is coupled between the DAC 708 and the charge sharing circuit 704 rather than integrated with the DAC 708. More specifically, the DAC 708 is configured to generate the data voltage VD_1-VD_N according to the display data DIN_1-DIN_N. The data calibration circuit 706 receives the data voltage VD_1-VD_N from the DAC 708, modifies/adjusts the data voltage VD_1-VD_N (i.e., generating a voltage shift), and then outputs the modified/adjusted data voltage to the charge sharing unit 704.

Figure 8:
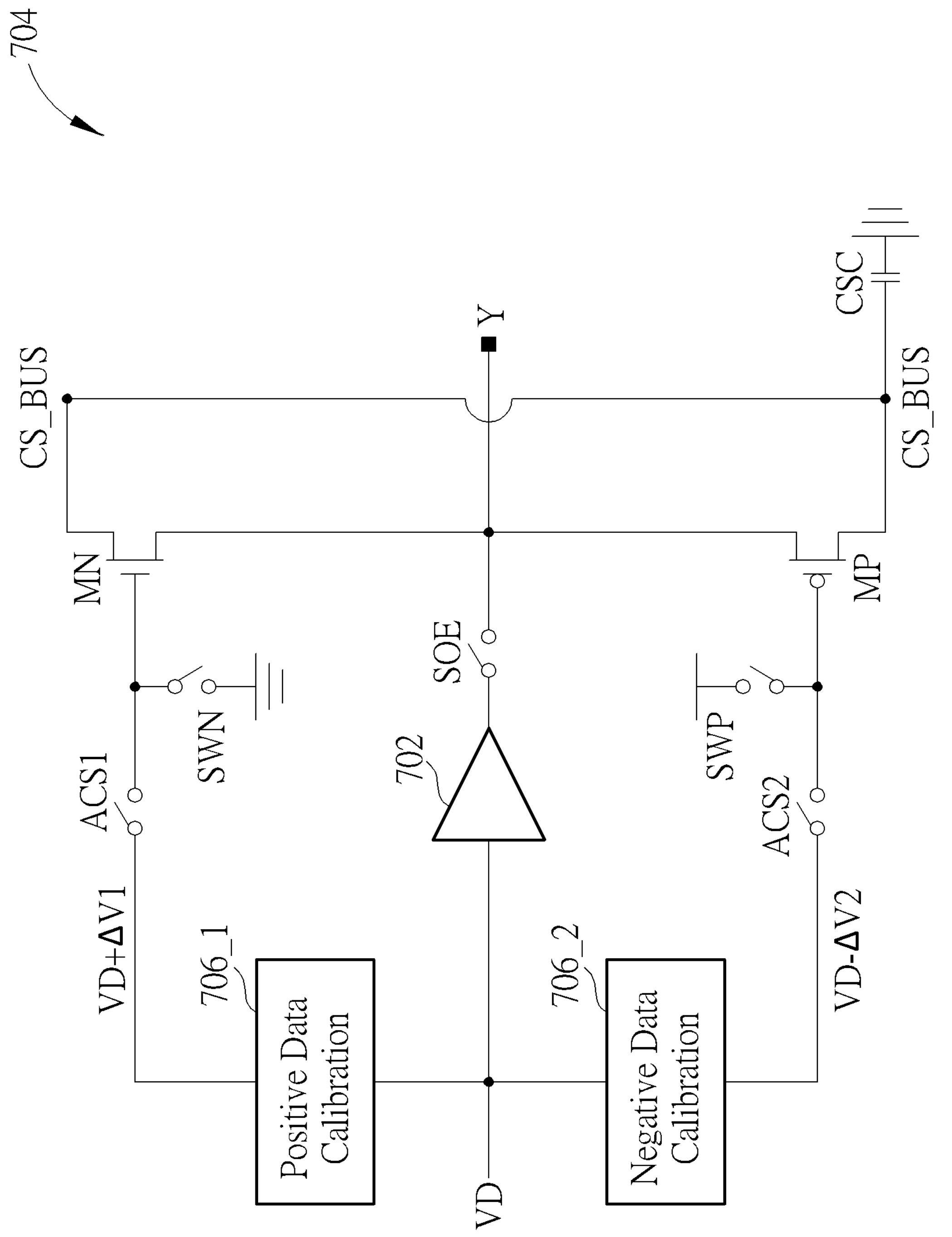
FIG. 8 is a schematic diagram of a detailed implementation of the charge sharing circuit along with the data calibration circuit according to an embodiment of the present invention.

FIG. 8 is a schematic diagram of a detailed implementation of the charge sharing circuit 704 along with the data calibration circuit 706 according to an embodiment of the present invention. As shown in FIG. 8, the circuit structure of the charge sharing circuit 704 is similar to the circuit structure of the charge sharing circuit 204 as shown in FIGS. 3A and 3B, so signals and elements having similar functions are denoted by the same symbols. In this embodiment, the charge sharing circuit 704 is coupled to a positive data calibration circuit 706_1 and a negative data calibration circuit 706_2, which may be used to implement the data calibration circuit 706 as shown in FIG. 7.

In detail, the positive data calibration circuit 706_1 is configured to receive the data voltage VD, and output the data voltage VD with a positive voltage shift +ΔV1 to the NMOS transistor MN. The negative data calibration circuit 706_2 is configured to receive the data voltage VD, and output the data voltage VD with a negative voltage shift −ΔV2 to the PMOS transistor MP. Based on the characteristics of the NMOS transistor MN and the PMOS transistor MP such as the threshold voltage, the values of the voltage shifts ΔV1 and ΔV2 may be the same or different.

Figure 9A:
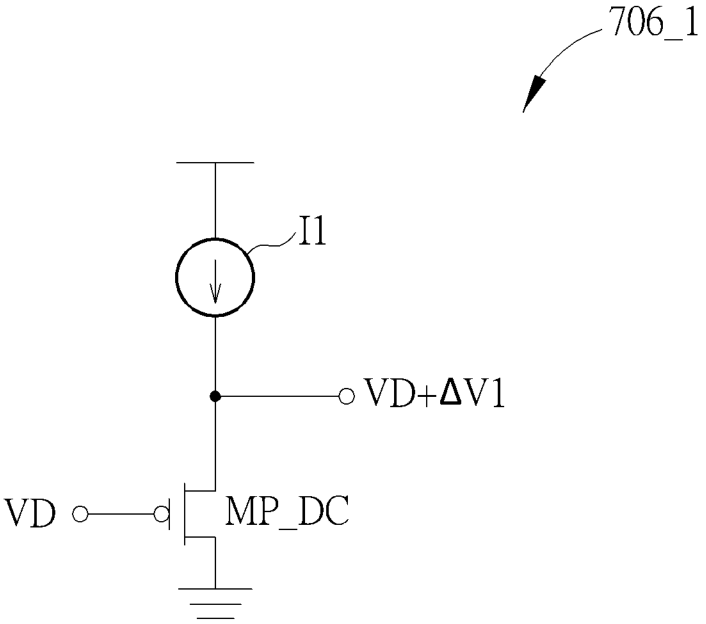
FIG. 9A and FIG. 9B illustrate an exemplary implementation of the positive data calibration circuit and the negative data calibration circuit, respectively.
Figure 9B:
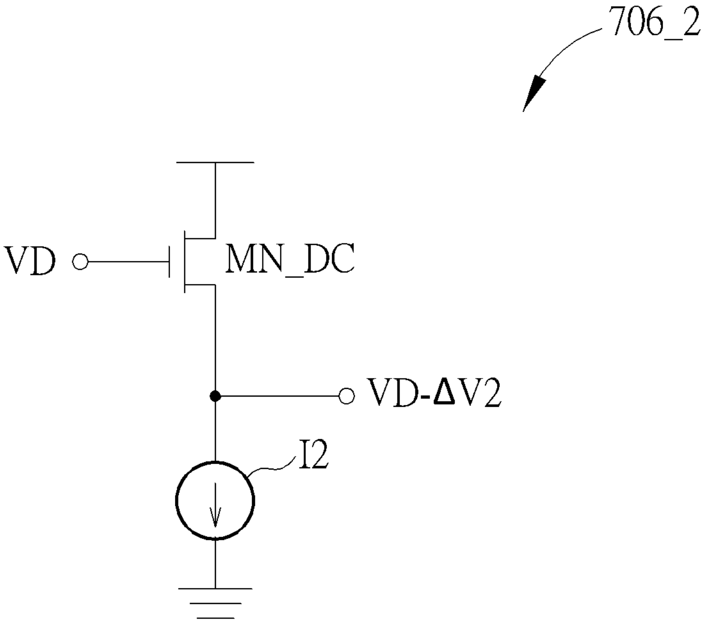

FIGS. 9A and 9B illustrate an exemplary implementation of the positive data calibration circuit 706_1 and the negative data calibration circuit 706_2, respectively. As shown in FIG. 9A, the positive data calibration circuit 706_1 may include a PMOS transistor MP DC and a current source I1. The PMOS transistor MP DC operates as a source follower, which receives the data voltage VD through its gate terminal and creates the positive voltage shift +ΔV1 on the data voltage VD to be output through its source terminal. The current source I1 provides a current for the source follower, allowing the source follower to operate normally.

Similarly, as shown in FIG. 9B, the negative data calibration circuit 706_2 may include an NMOS transistor MN DC and a current source I2. The NMOS transistor MN DC operates as a source follower, which receives the data voltage VD through its gate terminal and creates the negative voltage shift −ΔV2 on the data voltage VD to be output through its source terminal. The current source I2 provides a current for the source follower, allowing the source follower to operate normally.

In the embodiments as shown in FIGS. 9A and 9B, the current sources I1 and I2 may be well designed to provide appropriate output currents, and the sizes of the PMOS transistor MP DC and the NMOS transistor MN DC may be well designed, so that the values of the voltage shifts +ΔV1 and −ΔV2 may be well controlled to overcome the dead zone problem of the charge sharing circuit 704. However, the design of source follower in the data calibration circuit 706 may encounter the dead zone issue as well.

Figure 10:
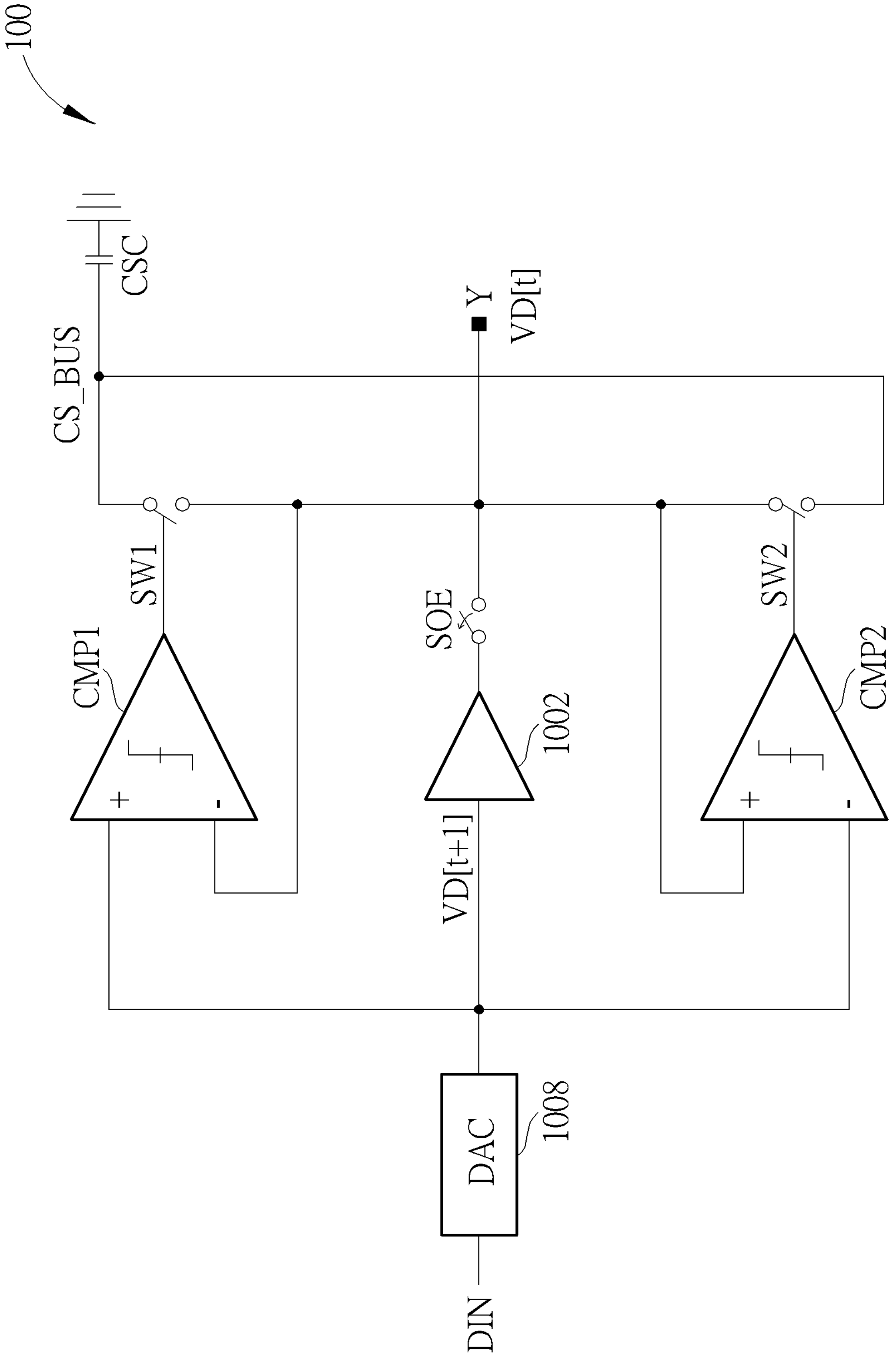
FIG. 10 is a schematic diagram of another charge sharing circuit according to an embodiment of the present invention.

Note that the structure of the charge sharing circuit 204 as shown in FIGS. 3A and 3B is one of various implementations of the present invention. Since the charge sharing circuit is used to determine whether to perform charge sharing according to the comparison of data voltages, it may be implemented by using a comparator. FIG. 10 is a schematic diagram of another charge sharing circuit 100 according to an embodiment of the present invention. As shown in FIG. 10, the charge sharing circuit 100 includes two comparators CMP1 and CMP2 and two control switches SW1 and SW2. An output buffer 1002, a DAC 1008 and an output enable switch SOE in the same driving channel and the charge sharing bus CS_BUS and the charge sharing capacitor CSC are also illustrated in FIG. 10 to facilitate the illustrations.

Similarly, the DAC 1008 is configured to receive the display data DIN and convert the display data DIN into the data voltage VD, which is then output to the output terminal Y through the output buffer 1002 when the output enable switch SOE is turned on in the driving phase. In this embodiment, the current data voltage VD[t] is on the output terminal Y of the driving channel, and the next data voltage VD[t+1] is on the output terminal of the DAC 1008 and ready to be output in the next driving phase.

The control switch SW1 is coupled between the charge sharing bus CS_BUS and the output terminal Y. The comparator CMP1, coupled to the control switch SW1, is configured to control the control switch SW1 according to the comparison of the current data voltage VD[t] on the output terminal Y and the next data voltage VD [t+1] to be output to the output terminal Y in the next driving phase. More specifically, the positive input terminal of the comparator CMP1 receives the next data voltage VD[t+1] and the negative input terminal of the comparator CMP1 receives the current data voltage VD[t]; hence, in the charging phase, the comparator CMP1 will turn on the control switch SW1 to perform charge sharing to pre-charge the data line if the next data voltage VD [ t+1] is greater than the current data voltage VD[t]. When the output terminal Y is pre-charged to a level approaching the next data voltage VD[t+1], the output signal of the comparator CMP1 changes and the control switch SW1 may be turned off.

The control switch SW2 is also coupled between the charge sharing bus CS_BUS and the output terminal Y. The comparator CMP2, coupled to the control switch SW2, is configured to control the control switch SW2 according to the comparison of the current data voltage VD[t] on the output terminal Y and the next data voltage VD[t+1] to be output to the output terminal Y in the next driving phase. More specifically, the negative input terminal of the comparator CMP2 receives the next data voltage VD[t+1] and the positive input terminal of the comparator CMP2 receives the current data voltage VD[t]; hence, in the charging phase, the comparator CMP2 will turn on the control switch SW2 to perform charge sharing to pre-discharge the data line if the current data voltage VD[t] is greater than the next data voltage VD[t+1]. When the output terminal Y is pre-discharged to a level approaching the next data voltage VD[t+1], the output signal of the comparator CMP2 changes and the control switch SW2 may be turned off.

In this way, the charge sharing circuit 100 composed of the control switches SW1 and SW2 controlled by the comparators CMP1 and CMP2 will not suffer from the dead zone problem. Also, the threshold of the comparators CMP1 and CMP2 may be well designed to improve the performance of charge sharing when the data voltage difference is small.

Please note that the present invention aims at providing a source driver in which multiple driving channels may be commonly coupled to a charge sharing bus to perform charge sharing, so as to reduce power consumption for charging the data lines. Those skilled in the art may make modifications and alterations accordingly. For example, in the above embodiments, the output terminals Y[1]-Y[N] of the driving channels are commonly coupled to the charge sharing capacitor CSC on the charge sharing bus CS_BUS when the charge sharing circuit 204 is turned on. In another embodiment, the charge sharing capacitor CSC may be omitted. If the driving channels have symmetric voltage transition behaviors, i.e., the rising voltage level and the falling voltage level are approximately equal in the overall driving channels, the electric charges of the driving channels whose voltage transits from high to low may be perfectly transferred to other driving channels whose voltage transits from low to high. This implementation without the charge sharing capacitor CSC may be feasible in some special image patterns where every two adjacent driving channels toggle between a higher level and a lower level alternately and inversely. As for a general image frame, the data voltages may change irregularly, and thus the charge sharing capacitor CSC is preferably used, in order to store the electric charges received from the capacitive loads on the display panel.

In addition, according to the present invention, the charge sharing effects may be achieved if any two or more of the output terminals Y[1]-Y[N] (and the corresponding driving channels) in the source driver 104 are coupled together. In an embodiment, all of the output terminals Y[1]-Y[N] are coupled to the same charge sharing bus CS_BUS through the corresponding charge sharing circuits 204. Alternatively, every specific number of output terminals may be coupled together to perform charge sharing. For example, among the output terminals Y[1]-Y[N], every two or four output terminals are considered as a group to be coupled together, and each group is apart from each other and may have their respective charge sharing bus and charge sharing capacitor. In another embodiment, the output terminals Y[1]-Y[N] may be divided into two groups (e.g., Y[1]-Y[N/2] and Y[(N/2)+1]–Y[N]), and each group is apart from each other and may have their respective charge sharing bus and charge sharing capacitor.

In the above embodiments, the charge sharing circuit may include a pair of transistors or a pair of control switches along with comparators to satisfy the charge sharing operation for both rising data voltages and falling data voltages in the driving channels. In fact, the charge sharing may be realized if any one of the pair of transistors or any one of the pair of control switches and comparators is deployed in the charge sharing circuit. As mentioned above, the charge sharing circuit may be realized by using an N-type implementation or a P-type implementation. In such a situation, the charge sharing circuit 204 as shown in FIGS. 3A and 3B may include only one of the NMOS transistor MN and the PMOS transistor MP. Note that in the charging phase of each display line period, at most one of the NMOS transistor MN and the PMOS transistor MP is turned on. If the next data voltage VD[t+1] is greater than the current data voltage VD[t] and thus pre-charging of the output terminal Y is required, only the NMOS transistor MN is turned on so that the charge sharing bus CS_BUS and the charge sharing capacitor CSC supply electric charges to pre-charge the output terminal Y (and the corresponding data line(s)), while the PMOS transistor MP may be in the off-state or even omitted. If the next data voltage VD[t+1] is smaller than the current data voltage VD[t] and thus pre-discharging of the output terminal Y is required, only the PMOS transistor MP is turned on so that additional electric charges on the output terminal Y (and the corresponding data line(s)) are pre-discharged to the charge sharing bus CS_BUS and the charge sharing capacitor CSC, while the NMOS transistor MN may be in the off-state or even omitted.

In a similar way, the charge sharing circuit 100 as shown in FIG. 10 may include only one of the control switches SW1 and SW2 and correspondingly include only one of the comparators CMP1 and CMP2. Note that in the charging phase of each display line period, at most one of the control switches SW1 and SW2 is turned on. If the next data voltage VD[t+1] is greater than the current data voltage VD[t] and thus pre-charging of the output terminal Y is required, only the control switch SW1 is turned on so that the charge sharing bus CS_BUS and the charge sharing capacitor CSC supply electric charges to pre-charge the output terminal Y (and the corresponding data line (s)), while the control switch SW2 may be in the off-state or even omitted (and the comparator CMP2 may be omitted accordingly). If the next data voltage VD[t+1] is smaller than the current data voltage VD[t] and thus pre-discharging of the output terminal Y is required, only the control switch SW2 is turned on so that additional electric charges on the output terminal Y (and the corresponding data line(s)) are pre-discharged to the charge sharing bus CS_BUS and the charge sharing capacitor CSC, while the control switch SW1 may be in the off-state or even omitted (and the comparator CMP1 may be omitted accordingly).

Figure 11:
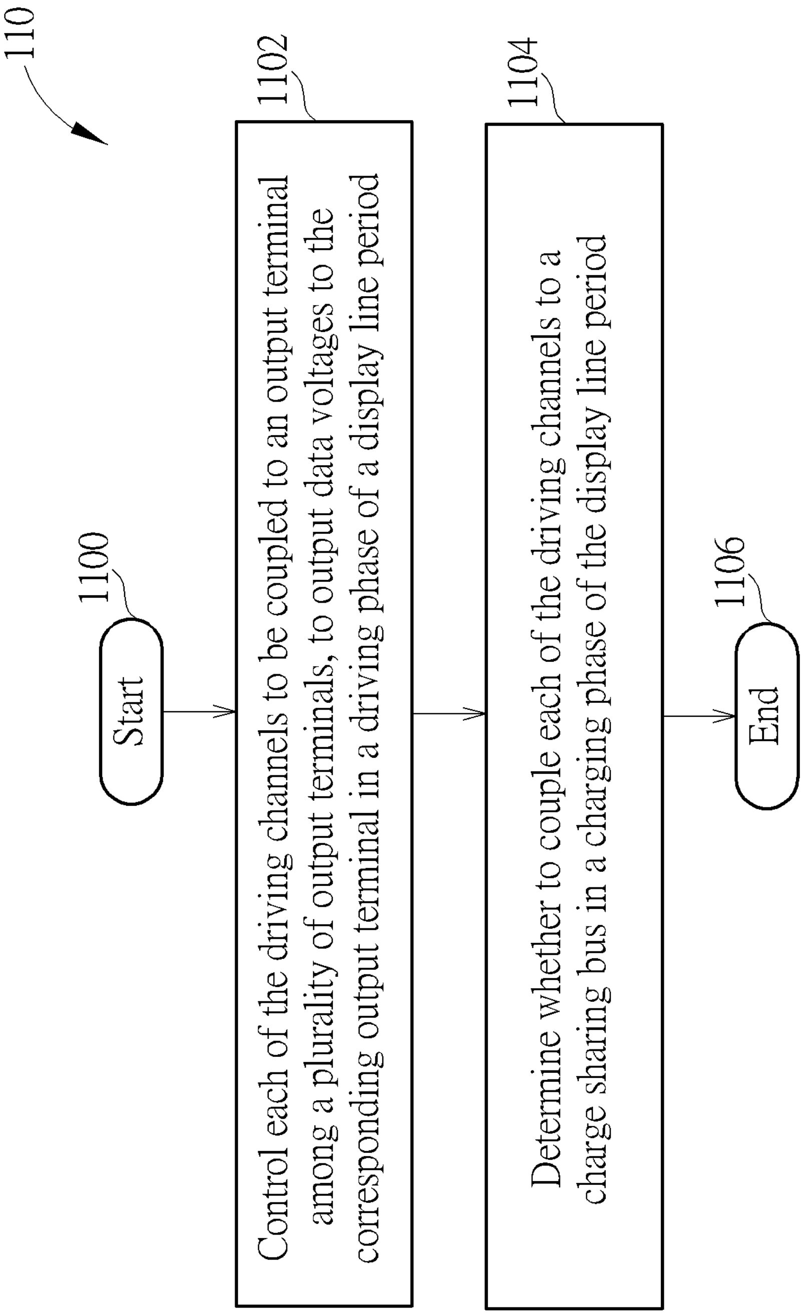
FIG. 11 is a flowchart of a process according to an embodiment of the present invention.

The abovementioned operations of the source driver may be summarized into a process 110, as shown in FIG. 11. The process 110 may be implemented in any of the driving channels in the source driver, such as the source driver 104 shown in FIG. 2. As shown in FIG. 11, the process 110 includes the following steps:

Step 1100: Start.

Step 1102: Control each of the driving channels to be coupled to an output terminal among a plurality of output terminals, to output data voltages to the corresponding output terminal in a driving phase of a display line period.

Step 1104: Determine whether to couple each of the driving channels to a charge sharing bus in a charging phase of the display line period.

Step 1106: End.

Note that the process 110 provides an adaptive charge sharing (ACS) function where each driving channel may be adaptively determined to be coupled to the charge sharing bus or not in the charging phase of each display line period. The charge sharing operation of each driving channel may be determined based on the data voltages, as described in the above paragraphs. The comparison of current consumptions with and without the ACS function under certain levels of toggling data voltages is shown in Table 1.

TABLE 1

| | Current consumption (μA) | | | | | |
|---|---|---|---|---|---|---|
| | Toggle 1*VDDA | | | Toggle 0.5*VDDA | | |
| | ACS function | | | | | |
| Data voltage | ON | OFF | Ratio | ON | OFF | Ratio |
| VDDA = 5 V | 36.87 | 49.43 | 0.746 | 21.14 | 27.33 | 0.774 |
| VDDA = 7.3 V | 55.91 | 75.57 | 0.740 | 30.65 | 39.86 | 0.769 |
| VDDA = 8.8 V | 69.06 | 94.69 | 0.729 | 36.50 | 47.72 | 0.765 |

The value of the supply voltage VDDA refers to the toggling amplitude of the data voltages in the driving channels. As can be seen in Table 1, the ACS function may provide nearly 25% reduction of current consumption as compared to the cases without the ACS function.

To sum up, in the embodiments of the present invention, the source driver for driving a display panel includes multiple driving channels, and each driving channel includes a charge sharing circuit and a data calibration circuit. The charge sharing circuit may couple the output terminal of the driving channel to a charge sharing bus where a charge sharing capacitor may be selectively disposed, and multiple driving channels may be commonly coupled to the charge sharing bus to perform charge sharing, so as to perform pre-charging or pre-discharging for the incoming data voltage. The charge sharing operation of the charge sharing circuit may be adaptively performed based on the data voltage difference. The data calibration circuit may be integrated with the DAC or coupled to the output terminal of the DAC, for providing a voltage shift for the charge sharing circuit based on the value of the data voltage. The voltage shift generated by the data calibration circuit may compensate for the threshold voltage of the transistor in the charge sharing circuit, to reduce a dead zone where the transistor cannot be turned on and the charge sharing operation is disabled. The value of the voltage shift may be well controlled to overcome the dead zone problem and also disable the charge sharing function if the data voltage difference is not obvious, so as to enhance the performance of charge sharing.

Therefore, when the charge sharing circuits in some driving channels are turned on, the corresponding output terminals may be commonly coupled to the charge sharing bus through the charge sharing circuits. Charge sharing may be performed during a charging phase (e.g., a blanking interval) of a display line period, to pre-charge or pre-discharge the data lines before the next data voltage is output in the next driving phase; hence, partial electric charges for charging the data lines may be supplied from other driving channels through the charge sharing operations, so as to reduce the electric power supplied by the output buffer and thereby reduce the overall power consumption of the source driver.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A source driver, comprising:
- a plurality of output terminals; and
- a plurality of driving channels, each coupled to an output terminal among the plurality of output terminals and comprising:
  - an output buffer;
  - an output enable switch, coupled between the output buffer and the corresponding output terminal;
  - a charge sharing circuit, coupled to the corresponding output terminal; and
  - a charge sharing switch, coupled to the charge sharing circuit, configured to enable or disable the charge sharing circuit;
- wherein the charge sharing circuits of at least two of the plurality of driving channels are commonly coupled to a charge sharing bus; and
- wherein each of the plurality of driving channels further comprises:
- a data calibration circuit, coupled to the charge sharing circuit, configured to generate a first voltage greater than a data voltage with a first voltage shift according to the data voltage and output the first voltage to the charge sharing circuit, or generate a second voltage smaller than the data voltage with a second voltage shift according to the data voltage and output the second voltage to the charge sharing circuit, wherein the data voltage is a voltage to be output to the corresponding output terminal.

2. The source driver of claim 1, wherein the charge sharing bus is coupled to a charge sharing capacitor.

3. The source driver of claim 1, wherein the charge sharing circuit comprises:

a first transistor, comprising:

a first terminal, coupled to the charge sharing bus;

a second terminal, coupled to the corresponding output terminal; and a gate terminal, coupled to a data calibration circuit through a first charge sharing switch;

wherein the first transistor is one of an NMOS transistor and a PMOS transistor.

4. The source driver of claim 3, wherein the charge sharing circuit further comprises:

a second transistor, comprising:

a first terminal, coupled to the charge sharing bus;

a second terminal, coupled to the corresponding output terminal; and a gate terminal, coupled to the data calibration circuit through a second charge sharing switch;

wherein the second transistor is the other one of the NMOS transistor and the PMOS transistor different from the first transistor.

5. The source driver of claim 4, wherein at most one of the first transistor and the second transistor is turned on in a charging phase of a display line period.

6. The source driver of claim 1, wherein the charge sharing circuit comprises:

a first control switch, coupled between the charge sharing bus and the corresponding output terminal; and a first comparator, coupled to the first control switch, configured to control the first control switch according to a comparison of a current data voltage on the corresponding output terminal and a next data voltage to be output to the corresponding output terminal.

7. The source driver of claim 6, wherein the charge sharing circuit further comprises:

a second control switch, coupled between the charge sharing bus and the corresponding output terminal; and a second comparator, coupled to the second control switch, configured to control the second control switch according to the comparison of the current data voltage on the corresponding output terminal and the next data voltage to be output to the corresponding output terminal.

8. The source driver of claim 7, wherein at most one of the first control switch and the second control switch is turned on in a charging phase of a display line period.

9. The source driver of claim 1, wherein the first voltage shift is determined according to a first threshold voltage of a first transistor comprised in the charge sharing circuit, and the second voltage shift is determined according to a second threshold voltage of a second transistor comprised in the charge sharing circuit.

10. The source driver of claim 1, wherein the data calibration circuit comprises at least one source follower.

11. The source driver of claim 1, wherein the data calibration circuit is integrated with a digital-to-analog converter (DAC) of the source driver, and configured to generate the first voltage and the second voltage according to a data code used to generate the data voltage by the DAC.

12. The source driver of claim 1, wherein the charge sharing circuit is configured to generate a charging path between the corresponding output terminal and the charge sharing bus, wherein the output enable switch is turned on and the charging path is turned off in a driving phase of a display line period, and the output enable switch is turned off and the charging path is turned on in a charging phase of the display line period.

13. A method of controlling a source driver, the source driver having a plurality of driving channels, each having a charge sharing circuit and the charge sharing circuit comprising a first control switch and a second control switch, the method comprising:

controlling each of the plurality of driving channels to be coupled to an output terminal among a plurality of output terminals, to output data voltages to the corresponding output terminal in a driving phase of a display line period; and determining whether to couple each of the plurality of driving channels to a charge sharing bus in a charging phase of the display line period;

wherein the step of determining whether to couple each of the plurality of driving channels to the charge sharing bus comprises:

turning on the first control switch to couple the driving channel to the charge sharing bus while keeping the second control switch off when a next data voltage to be output to the corresponding output terminal is greater than a current data voltage on the corresponding output terminal; and turning on the second control switch to couple the driving channel to the charge sharing bus while keeping the first control switch off when the next data voltage to be output to the corresponding output terminal is smaller than the current data voltage on the corresponding output terminal.

14. The method of claim 13, wherein the driving phase comprises a display interval, and the charging phase comprises a blanking interval.

15. The method of claim 13, further comprising:

determining whether to couple one of the plurality of driving channels to the charge sharing bus according to the current data voltage on the corresponding output terminal and the next data voltage to be output to the corresponding output terminal.

16. The method of claim 15, wherein the step of determining whether to couple the driving channel to the charge sharing bus according to the current data voltage on the corresponding output terminal and the next data voltage to be output to the corresponding output terminal comprises:

determining to couple the driving channel to the charge sharing bus when a voltage difference between the current data voltage on the corresponding output terminal and the next data voltage to be output to the corresponding output terminal is greater than a threshold.

17. The method of claim 15, wherein the step of determining whether to couple the driving channel to the charge sharing bus according to the current data voltage on the corresponding output terminal and the next data voltage to be output to the corresponding output terminal comprises:

determining not to couple the driving channel to the charge sharing bus when a voltage difference between the current data voltage on the corresponding output terminal and the next data voltage to be output to the corresponding output terminal is equivalent to or smaller than a threshold.

* * * * *